United States Patent

[11] 3,542,201

[72] Inventors Robert L. Belonger;
Samuel F. Berg, Delavan, Wisconsin
[21] Appl. No. 807,178
[22] Filed March 14, 1969
[45] Patented Nov. 24, 1970
[73] Assignees Sta-Rite Industries, Inc.
Delavan, Wisconsin
a corporation of Wisconsin, a fractional part interest by mesne assignments,
Major Pool Equipment Corporation,
Clifton, New Jersey.

[54] PUMP AND STRAINER ASSEMBLY FOR A SWIMMING POOL FILTER SYSTEM
12 Claims, 6 Drawing Figs.
[52] U.S. Cl. .................................................. 210/169;
103/113
[51] Int. Cl. .................................................. E04h 3/20
[50] Field of Search .......................................... 210/169;
103/96, 115, 111M, 111F

[56] References Cited
UNITED STATES PATENTS
2,137,397 11/1938 Holdeman ..................... 210/169X
3,051,312 8/1962 Arge ............................ 210/169X
3,169,920 2/1965 Payne ........................... 210/169
3,288,294 11/1966 Frey ............................ 210/169X
3,371,789 3/1968 Hense .......................... 210/169

Primary Examiner—Reuben Friedman
Assistant Examiner—T. A. Granger
Attorney—Andrus, Sceales, Starke & Sawall ABSTRACT: A pump and strainer assembly for a swimming pool filter system. The assembly includes a housing defining a pumping chamber and having an axial water inlet and an outlet connected to a filter bed. An impeller is disposed within the pumping chamber and is driven by a motor mounted beneath the housing.

A strainer casing is connected to the upper end of the housing and a perforated open-top strainer basket is mounted on a ledge within the casing. Water is drawn into the upper end of the casing and passes through the strainer basket to strain out larger objects and the strained water is then drawn into the inlet of the pumping chamber where the impeller operates to discharge it through the outlet to the filter bed.

Patented Nov. 24, 1970

INVENTOR.
Robert L. Belonger
Samuel F. Berg
BY
Andrus, Sceales, Starke & Sawall
Attorneys Patented Nov. 24, 1970

INVENTOR.
Robert L. Belonger
BY Samuel F. Berg

Attorneys

PUMP AND STRAINER ASSEMBLY FOR A SWIMMING POOL FILTER SYSTEM

This invention relates to pump and strainer assembly for a swimming pool filter system.

Swimming pool water is normally circulated through a filter bed for clarification and the filtered water is then returned to the pool. Before passing to the filter bed, the water is strained to remove larger objects, such as leaves, twigs and the like, so that the filtering media in the bed will not be contaminated with the larger foreign materials.

The present invention is directed to an improved pump and strainer assembly for use with a swimming pool filter system. More specifically, the assembly includes a housing defining a pumping chamber and having an axial water inlet and an outlet connected to a filter bed. An impeller is disposed within the pumping chamber and is driven by a motor mounted beneath the housing.

Mounted on the upper surface of the housing is a strainer casing, and a perforated open-top strainer basket is supported on a ledge in the casing. The upper surface of the rim of the basket is provided with a pair of inclined surfaces, and by rotating the basket within the casing the inclined surfaces ride against projections formed on the casing wall to lock the strainer basket securely to the casing. The engagement of the inclined or cam surfaces with the projections on the casing wall, insures that the basket will not rattle or vibrate during operation of the pumping system.

As a further advantage, the unit is self-priming. The pump is located beneath the strainer basket and also beneath the outlet so that the water in the discharge and inlet pipes will flow to the pumping chamber after the pump has stopped operation to thereby fill the pumping chamber with water and provide a prime for the pump when it is restarted.

The lower portion of the pumping chamber is enlarged and provides a sump within which sand, dirt and small objects can accumulate after passing through the strainer basket. The sump aids in preventing sediment and other foreign material from contacting the seal for the drive shaft. The sediment can be readily cleaned from the sump by opening a drain outlet in the sump and flushing with the pumped water.

The motor drive shaft seal includes a rotating sealing element connected to the impeller and a nonrotating sealing element secured to the pump housing. The joint or interface between the two sealing elements is located a substantial distance above the bottom of the sump, thereby preventing sediment from entering the sealing face between the sealing elements.

As an additional feature of the invention, a plastic shield is incorporated which, in combination with a slinger, serves to deflect any water which may have leaked through the seal assembly outwardly to the periphery of the motor casing, thereby preventing the leakage from contacting the motor bearings. The shield is provided with a downwardly extending skirt which is located outwardly of the vent holes in the motor casing and prevents rain or splashing water from entering the vent holes in the motor casing.

Other objects and advantages will appear in the course of the following description.

The drawings illustrate the best mode presently contemplated of carrying out the invention.

Figure 1:
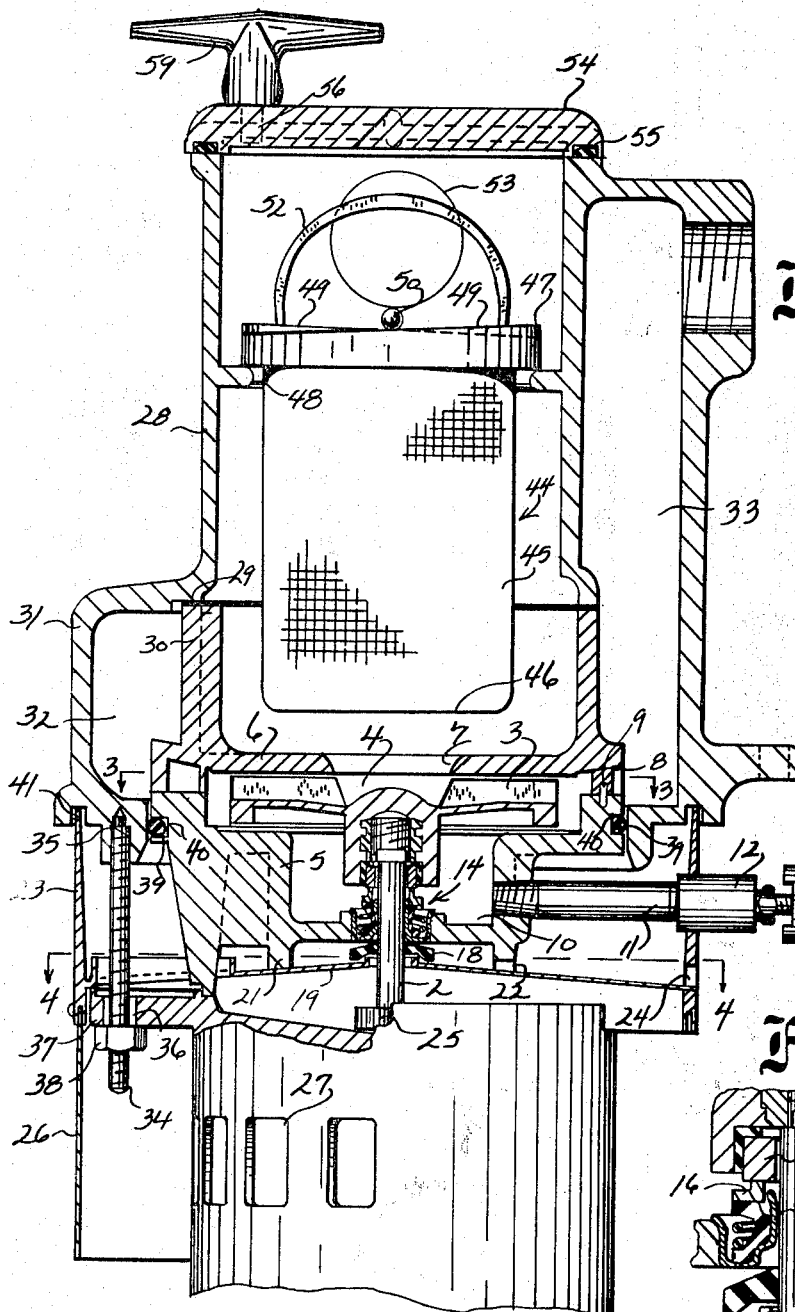
FIG. 1 is a vertical section of the pump and strainer assembly of the invention.
Figure 5:
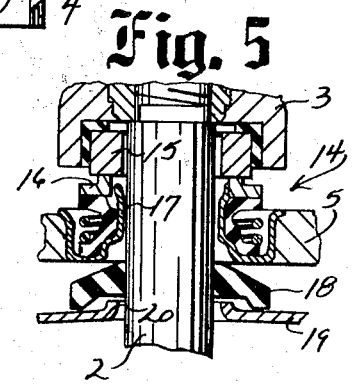
FIG. 5 is an enlarged fragmentary vertical section showing the shaft seal construction.
Figure 2:
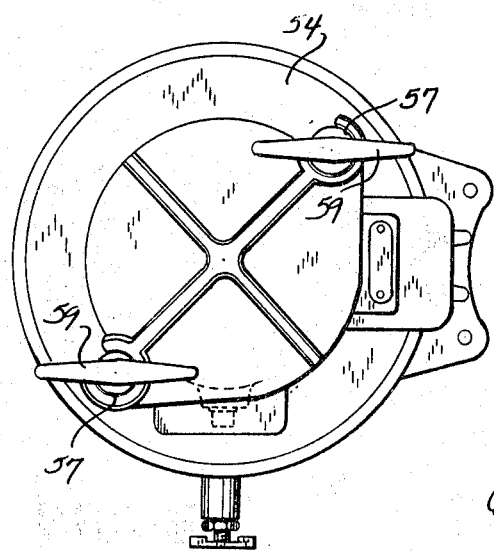
FIG. 2 is a top view of the assembly.
Figure 3:
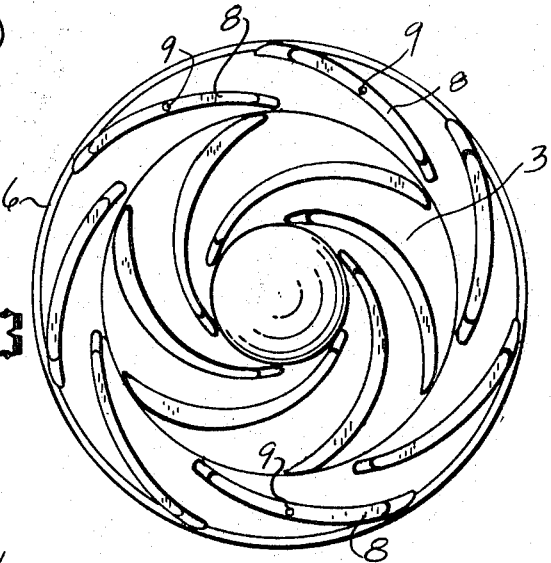
FIG. 3 is a transverse section taken along line 3-3 of FIG. 1.
Figure 6:
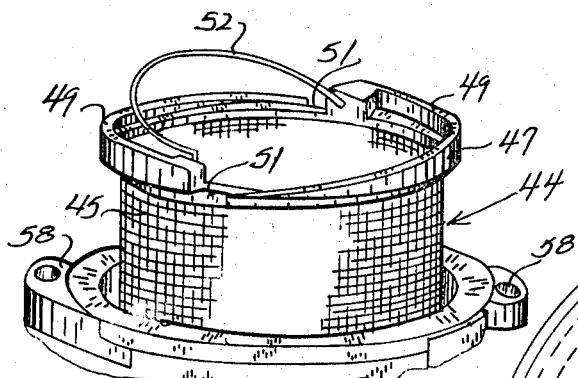
FIG. 6 is a fragmentary perspective view of the upper portion of the strainer basket.
Figure 4:
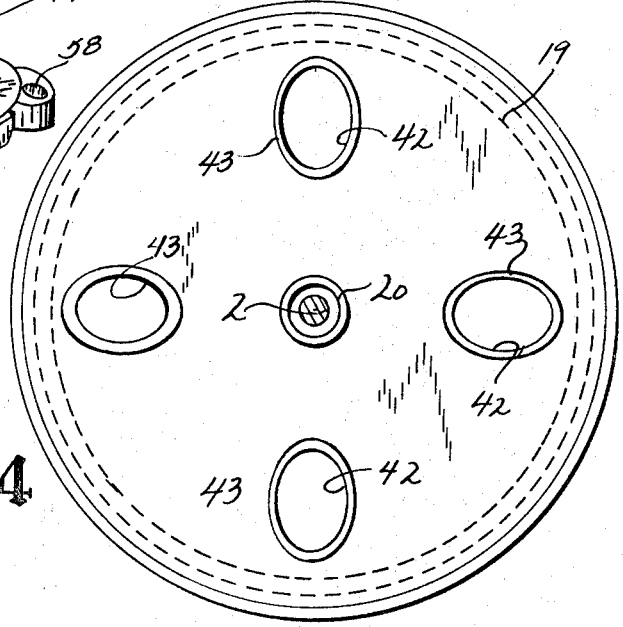
FIG. 4 is a section taken along line 4-4 of FIG. 1.

FIG. 1 illustrates the pump and strainer assembly of the invention which comprises a motor having an upwardly extending drive shaft 2 and an impeller 3 is secured to the upper end of the drive shaft. The impeller 3 is a conventional semiopen type and the construction of the impeller is not critical to the invention.

The impeller 3 rotates within a pumping chamber 4 defined by the lower pump housing 5 and a diffuser 6 which encloses the upper open end of the pump housing. Water is introduced into the pumping chamber 4 through an axial inlet 7 in the diffuser 6, and the impeller operates to discharge the water outwardly through a series of diffuser passages defined by the curved vanes 8 of the diffuser.

The diffuser 6 is alined with the pump housing 5 by a series of dowels or pins 9 which are received within alined openings in the diffuser vanes 8 and in the upper edge of the pump housing 5. As the alining pins 9 are received within openings in the diffuser vanes 8 to provide alinement of the members, rather than utilizing a rabbited fit for alinement as in conventional pumps, the overall diameter of the pump housing 5 and diffuser 6 can be reduced, thereby providing more usable space for hydraulic design.

As shown in FIG. 1, the lower end of the pumping chamber 4 is enlarged and defines a sump 10. A drain tube 11 is threaded within an opening in the wall of the housing 5 and the outer end of the tube is provided with a drain valve 12 which is opened and closed by means of a pet cock 13. During operation of the pumping system, foreign materials such as sand, dirt and other small objects may tend to accumulate within the sump 10 and the sediment of foreign material can be drained from the sump by opening the valve 13 while the pump is operating, thereby causing the water in the pumping chamber to flush the sump and be discharged through the open valve 13.

A mechanical shaft seal assembly 14 is associated with the drive shaft 2 and serves to prevent leakage of the water from the pumping chamber downwardly along the drive shaft to the motor bearings. The seal assembly 14 includes a rotating sealing element 15, which usually takes the form of a ceramic insert, secured to the lower end of the impeller 3. The lower surface of the insert 15 is adapted to rotate against a sealing ring 16 of the fixed sealing element 17 secured within an opening in the pump housing 4. The sealing face between the insert 15 and ring 16 is located a substantial distance above the bottom of the sump 10, at a location where sediment within the sump will not enter the interface between the nonrotating and rotating elements and this also tends to prevent sand, grit and other foreign material from passing through the seal assembly to the motor bearings.

Secured to the shaft 2 beneath the seal assembly 14 is a slinger 18 made of plastic or other noncorrosive material. Any leakage which passes through the seal assembly 14 is thrown outwardly by centrifugal force by the slinger 18. Cooperating with the slinger 18 to deflect leakage outwardly, is a plastic shield 19. The shield 19 has a central upwardly extending flange 20 which surrounds the drive shaft 2 and extends upwardly into a recess formed in the lower end of the slinger 18. The flange 20 acts in cooperation with the slinger 18 to prevent any water or other foreign material from passing downwardly along the drive shaft 2.

As shown in FIG. 1, the housing 5 is provided with a downwardly extending annular flange 21 which bears against the upper surface of the plastic shield. Flange 21 is provided with a slot 22, and any water or other material which is thrown outwardly by the slinger 18 passes through the slot and will flow outwardly along the inclined upper surface of the shield 19 to the periphery of the shield. Extending upwardly from the periphery of the shield 19 is a flange 23, and flange 23 is provided with a slot 24 so that water flowing along the upper surface of the shield can pass through the slot 24 to the exterior. Slots 22 and 24 are not in alinement so that splashing water from the exterior cannot pass inwardly to the shaft 2.

The seal assembly 14, slinger 18, and plastic shield 19 are designed to prevent leakage of water downwardly along the drive shaft 2 to the shaft bearing assembly 25. Any leakage which passes through the seal assembly 14 is thrown outwardly by the slinger 18 and will then drain along the inclined surface of the shield 19, passing through the slots 22 and 24 to the exterior. As the shield 19 extends radially outward beyond the periphery of the motor 1, water draining through the slot 24 will ordinarily not contact the motor.

In addition, the shield 19 is provided with a curved skirt 26 which extends downwardly from the shield and extends through an arc of approximately 180°. The skirt 26 is located outwardly of the vent slots 27 in the motor casing and prevents draining water, rain or splashage from entering the holes or vents 27.

In accordance with a feature of the invention, a strainer casing 28 is mounted on the diffuser 6 and water is strained before it enters the pumping chamber 4. As shown in FIG. 1, the annular surface 29 of the casing 28 is adapted to rest on the upwardly extending flange 30 of diffuser 6, and a suitable sealing gasket is located between the surfaces.

The casing 28 is provided with an outwardly extending extension 31 which, in combination with flange 30 of diffuser 6, defines a discharge water chamber 32 and the water passing through the diffuser passages enters the discharge chamber 32 and then passes through the vertical outlet passage 33 to the filter bed, not shown.

To connect the casing 28 to the motor 1, a series of long studs 34 are threaded within openings 35 in the lower end of extension 31 and the lower ends of the studs extend downwardly through openings 36 in the flange 37 of the motor casing. The lower ends of the studs 34 receive nuts 38, and by threading down the nuts on the studs, the casing 28 is drawn toward the motor thereby firmly securing the mating surfaces 29 and 30 of the casing 28 and diffuser 6.

As the flange 30 is formed on the diffuser 6, rather than on the casing 28, the casting of the casing is simplified for the casing can be cast with only a single core. This would not be possible if the flange 30 was formed on the casing 28 rather than on the diffuser 6.

The studs 34, because of their length, act as jackscrews to drive the motor home against the casing 28.

To seal the joint between the pump housing 5 and the extension 31 of casing 28, a seal 39 is mounted within a circumferential groove 40 formed in the outer surface of the housing 5. Seal 39 functions as a sliding seal and slides against the adjacent surface of the extension 31 as the members are drawn together by the studs 34. The use of the sliding seal 39 insures that the gasket between the surfaces 29 and 30 will always be fully compressed when the studs are tightened down. This construction eliminates tolerances on two sealing surfaces which have generally been employed in conventional pump constructions.

The lower edge of the casing extension 31 is provided with an annular recess 41 which receives the upper edge of the flange 23 of plastic shield 19, so that rain or splashing flowing downwardly along the outside of the casing 28 will be directed across the outer surface of the flange 23 and away from the motor bearings.

To permit the passage of the studs 34 through the shield 19, the shield is provided with a series of openings 42 which are bordered by upstanding flanges 43. As best shown in FIG. 1, the studs 34 as well as projections on the lower end of the pump housing extend through the openings 42, and the flange 43 prevents water which may be draining along the upper surface of shield 19 from entering the openings.

A strainer basket 44 is mounted within the casing 28 and the basket includes a generally cylindrical sidewall 45 and bottom wall 46, both of which are formed with a perforated or open construction. The strainer basket 44 is preferably formed of a corrosion-resistant material, such as plastic, and has an open top into which the water is introduced. The size of the openings in the sidewall 45 and bottom 46 is such that larger objects such as twigs, leaves, and the like, will be retained within the basket, and the basket is adapted to be periodically removed and the collected material dumped from the basket.

Bordering the open upper end of the strainer basket 44 is an outwardly extending rim 47 which rests on a circumferential ledge 48 formed in the inner wall of the casing 28. With the rim 47 supported on the ledge 48, the bottom 46 of the basket is spaced slightly above the inlet opening 7 in the diffuser 6.

To lock the basket 44 in place within the casing 28, so as to prevent vibration and rattling, the rim 47 is provided with a pair of inclined cam surfaces 49, which are adapted to wedge under projections 50 formed in the sidewall of the casing as the basket is rotated within the casing.

The rim 47 is provided with a pair of diametrically opposed notches 51 which receive the projections 50 as the basket is placed in the casing. The basket is then rotated and the inclined surfaces 49 ride against the lower edge of the projections 50 to wedge the basket tightly against the projections and thereby prevent movement of the basket within the casing. To remove the basket, the basket is merely rotated in the opposite direction until the notches 51 are in alinement with the projections 50 and the basket can then be withdrawn vertically from the casing.

The strainer basket 44 is provided with a wire handle 52 the ends of which are pivotally connected to the rim. The handle aids in inserting and withdrawing the basket from the casing as well as rotating the basket to lock the same within the casing.

Water from the swimming pool is introduced into the casing through an inlet opening 53 provided in the upper end of the casing above the level of the strainer basket 44. The water entering through the inlet 53 will thus be directed downwardly through the basket which serves to collect the larger debris, as previously mentioned.

The open upper end of the casing 28 is enclosed by a cover 54, and a seal or gasket 55 is mounted in a recess in the cover and seals the joint between the cover and the casing. To lock the cover to the casing, a pair of studs 56 extend within notches 57 formed in the cover and are threaded within openings formed in projections 58 on the casing wall. The upper end of the studs are provided with knobs 59 and when the studs are threaded down, the lower ends of the knobs bear against the cover 54 to lock the cover to the casing.

We claim:

1. In a pumping apparatus, drive means including an upwardly extending drive shaft, a housing defining a pumping chamber located above the drive means, an impeller connected to the drive shaft and located within the pumping chamber, inlet means for supplying liquid to said pumping chamber, outlet means for discharging liquid from said pumping chamber, the lower portion of said pumping chamber defining a sump, seal means associated with the drive shaft and located within said pumping chamber, and a shield disposed between the housing and the drive means and located beneath said seal means and extending radially outward from said drive shaft, with the peripheral edge of the shield extending outwardly beyond the periphery of the drive means, said shield having an outwardly and downwardly sloping upper surface whereby any leakage through said seal means will flow along said surface to the exterior of the drive means.

2. The apparatus of claim 1, and including drain means separate from said outlet means and connected to the pump for draining liquid therefrom.

3. The apparatus of claim 2, and including shaft seal means associated with the drive shaft, said seal means including a first sealing element connected to the impeller and a second sealing element connected to the lower section of the housing, the joint between said first and second sealing elements being located a substantial distance above the bottom of said sump.

4. The apparatus of claim 1, and including slinger means secured to the shaft and located between said seal means and the shield, said slinger means rotating with said shaft and acting to throw leakage outwardly by centrifugal force toward the periphery of said shield.

5. The apparatus of claim 4, wherein the lower surface of said slinger means is provided with a recess, and the central portion of said shield bordering the shaft is provided with an upwardly extending flange received within the recess in said slinger means.

6. The apparatus of claim 1, and including a downwardly extending skirt secured to the outer peripheral portion of the shield.

7. The apparatus of claim 1, wherein said drive means is an electric motor including an outer casing and said outer casing is provided with a plurality of vent holes, said apparatus also including a downwardly extending skirt connected to the peripheral portion of said shield and extending over the outer surface of said motor casing to enclose said vent holes.

8. The apparatus of claim 1, and including a flange extending upwardly from the outer periphery of said shield, said flange provided with a slot adjacent the shield and positioned so that leakage flowing outwardly along said shield can pass through the slot to the exterior.

9. In a pumping apparatus, drive means including an upwardly extending drive shaft, a housing defining a pumping chamber located above said drive means, an impeller connected to the drive shaft and disposed within said pumping chamber, a casing disposed above the housing, first conduit means providing communication between the lower end of the casing and said pumping chamber for supplying liquid from the casing to the pumping chamber, outlet means for discharging liquid from the pumping chamber, strainer means removably mounted within the casing, means for introducing liquid into the upper end portion of the casing, said liquid passing through said strainer means to said conduit means and said strainer means serving to remove foreign material from said liquid, a series of studs connecting said casing to said drive means, one end of each stud being threaded within an opening in said casing and the second end of each stud extending through an opening in said drive means, and a nut threadedly engaged with the second end of each stud, threading down of the nuts on the studs drawing the casing towards the drive means to secure the members together.

10. The apparatus of claim 9, wherein said housing has an outer peripheral surface and a portion of the casing is located radially outward of said peripheral surface, and sealing means disposed between said peripheral surface and said portion of the casing, said outer peripheral surface and said portion of the casing disposed to move axially with respect to each other during assembly of said apparatus and said sealing means following said axial movement to retain the seal therebetween.

11. In a pumping apparatus, drive means including an upwardly extending drive shaft, a housing defining a pumping chamber located above said drive means, an impeller connected to the drive shaft and disposed within said pumping chamber, a casing disposed above the housing, first conduit means providing communication between the lower end of the casing and said pumping chamber for supplying liquid from the casing to the pumping chamber, outlet means for discharging liquid from the pumping chamber, strainer means removably mounted within the casing, means for introducing liquid into the upper end portion of the casing, said liquid passing through said strainer means to said conduit means and said strainer means serving to remove foreign material from said liquid, said strainer means comprising a perforated open-top basket, said basket having an outwardly extending rim, ledge means on the inner surface of said casing, said rim being supported on said ledge means to thereby mount said basket within the casing, said rim having a cam surface and the inner wall of said casing being provided with a projection located above said ledge means and disposed to be engaged by said cam surface as the basket is rotated within the casing to thereby wedge said surface against the projection and lock the basket to the casing, and handle means attached to the basket and disposed to be engaged by an operator to rotate the basket within the casing.

12. In a pumping apparatus, a drive member having an upwardly extending drive shaft, a housing defining a pumping chamber located above said drive means, an impeller connected to the drive shaft and disposed within said pumping chamber, a casing member disposed above the housing, first conduit means providing communication between the lower end of the casing member and said pumping chamber for supplying liquid from the casing member to the pumping chamber, strainer means removably mounted within the casing member, means for introducing liquid into the upper end portion of the casing member, said liquid passing through said strainer means to said conduit means and said strainer means serving to remove foreign material from said liquid, a series of studs connecting said casing member to said drive member, one end of each stud being secured to one of said members and the second end of each stud extending through an opening in the other of said members, a nut threadedly engaged with the second end of each stud, threading down of the nuts on the studs drawing the casing member toward the drive member to secure the members together, said housing including an upwardly extending annular flange and said casing member having a surface disposed in abutting relation with the upper end of said flange, first sealing means disposed between the upper end of the flange and said surface, said housing also having an outer peripheral surface and a portion of the casing member being located radially outward of said outer peripheral surface of the housing, and second sealing means disposed between said outer peripheral surface and said portion of the casing member, said outer peripheral surface of the housing and said portion of the casing member disposed to move axially with respect to each other during threading down of said nuts and said second sealing means arranged to follow said axial movement to retain the seal therebetween.